United States Patent [19]

Moss

[11] 4,254,848
[45] Mar. 10, 1981

[54] SPROCKET-ACTUATED BRAKE

[75] Inventor: Mark D. Moss, Hollidaysburg, Pa.

[73] Assignee: Hedstrom Co., Bedford, Pa.

[21] Appl. No.: 949,519

[22] Filed: Oct. 10, 1978

[51] Int. Cl.³ .............................................. B62L 1/00
[52] U.S. Cl. ....................................... 188/24; 188/31
[58] Field of Search .................................. 188/24–27, 188/69, 60, 31, 134

[56] References Cited

U.S. PATENT DOCUMENTS

| 3,774,732 | 11/1973 | Basek | 188/24 |
| 3,854,555 | 12/1974 | Quisenberry | 188/24 |

Primary Examiner—Douglas C. Butler
Attorney, Agent, or Firm—Cesari and McKenna

[57] ABSTRACT

A sprocket-actuated bike brake includes a brake shoe swingable against the rear tire by an actuator engaged by the sprocket teeth when the pedal sprocket is rotated in reverse. Using a small number of parts, the brake couples a maximum amount of force from the sprocket to the brake shoe and imparts a drag on the tire which is proportional to the force on the pedals so that the bike has a stop length versus pedal force characteristic which is substantially linear.

7 Claims, 5 Drawing Figures

SPROCKET-ACTUATED BRAKE

BACKGROUND OF THE INVENTION

This invention relates to a brake. It relates more particularly to a sprocket-actuated brake for use on a chain driven bicycle.

The brakes commonly found on present-day bicycles fall generally into two categories. There is the hand-actuated caliper brake usually installed on multiple speed bicycles and the pedal-actuated departure brake installed in the rear wheels of single speed bikes, such brake being actuated through the chain by applying a reverse torque to the pedal sprocket. Recent U.S. government regulations have been established requiring bike brakes to meet certain standards. Although the above brakes do meet those standards, they are quite expensive, indeed too expensive to be installed on present-day, low cost, single speed, chain driven sidewalk bikes used by small children.

Recently there has been developed a low cost bike brake whose shoe is urged into frictional engagement with the tire on the rear wheel when a reverse torque is applied to the pedal sprocket. The brake mechanism includes a U-shaped brake shoe which is pivotally supported by a bracket secured to the bicycle frame opposite the tire. An arm, one end of which is pivotally connected to the shoe, has its opposite end engaging the teeth on the pedal sprocket. When the pedal sprocket is rotated in the forward direction to propel the bicycle, the arm end simply rides on the sprocket teeth. However, when the rider applies a reverse torque to the pedal sprocket, the sprocket teeth engage the arm and push it rearwardly so that the arm presses the brake shoe against the bicycle tire thereby bringing the vehicle to a stop. A brake such as that is disclosed in U.S. Pat. No. 3,774,732.

That particular brake has several drawbacks which have militated against its full acceptance in the marketplace. It requires a special bike frame and pedal sprocket. Also, as the rider rotates the pedal sprocket to propel the bicycle, the arm of the brake mechanism rides on the sprocket teeth thereby producing a noisesome chattering or ratcheting noise which is annoying to the rider and to others in the vicinity of the moving bicycle.

We are also aware of a variation of that construction which includes a pair of metal plates which engages circular ribs on opposite faces of the pedal sprocket to bias the toothengaging portion of the arm away from the sprocket when the bike is pedalled in the forward direction to minimize that noise. However, that brake still requires a special pedal sprocket and indeed a special bike frame for its installation. It still has a relatively large number of parts. It is not particularly efficient in that much of the braking force applied by the rider is lost in its various linkages. Moreover its sprocket-engaging arm does not always bottom in the links between the sprocket teeth so that the applied battery force varies.

Furthermore, it has been found that the stop-length versus force characteristic of that prior brake is not linear. As the rider turns the pedal sprocket in reverse through a selected angle, the amount of force transmitted through a selected angle, the amount of force transmitted through the arm to the brake shoe varies so that the braking force applied by the shoe to the rear tire also varies. Resultantly, unless the rider compensates for the nonlinearity by easing up on the pedals, a bicycle may come to a very sudden stop and cause the rider to lose control of the bike. It is believed that the non-linear stop-length versus force characteristic of that prior brake is due to the fact that the angle which the arm makes with the sprocket and shoe changes to a considerable extent during operation of the brake thereby changing the amount of torque applied to the brake shoe as the sprocket is rotated in reverse to stop the bike.

The prior brake construction also has too many parts and requires a special stop lug to limit the pivotal motion of the shoe toward the tire. Otherwise, its sprocket-engaging arm might become bound up on the sprocket thereby rendering the brake inoperative.

SUMMARY OF THE INVENTION

Accordingly, it is an object of this invention to provide a relatively inexpensive sprocket-actuated brake for installation on a low-cost bicycle.

A further object of this invention is to provide an efficient sprocket-actuated brake which has a linear stop-length versus force characteristic.

Another object is to provide such a brake that is not prone to becoming bound up.

Yet another object of the invention is to provide a sprocket-actuated bicycle brake which does not produce any ratcheting noise when the vehicle is being propelled.

Still another object of the invention is to provide a brake of this type which is comprised of a minimum number of easily formed parts which are easily assembled so that the brake is relatively inexpensive to manufacture.

Another object of the invention is to provide a brake of this type which can be installed on existing chain-driven sidewalk bikes.

Other objects will in part be obvious and will in part appear hereinafter.

The invention accordingly comprises the features of construction, combination of elements and arrangement of parts as will be exemplified in the following detailed description, and the scope of the invention will be indicated in the claims.

Briefly, the subject brake mechanism is arranged to be installed on existing chain-driven sidewalk bikes between the pedal sprocket and rear fork. A free-wheeling rear sprocket is provided to replace the standard fixed sprocket on the rear wheel.

The brake mechanism includes a mounting bracket having a nose arranged to be hooked at the root of the rear fork and a tongue which extends forwardly underneath the vehicle frame with its forward end being bolted to the frame by means of the same bolt that clamps the vehicle's sprocket assembly to the frame. Therefore installation of the brake mechanism itself on a bike equipped with a free-wheeling sprocket simply requires the removal of the nut from that bolt, the positioning of the mounting bracket tongue on that bolt, and the replacement of the nut.

Pivotally connected to the mounting bracket is a saddle-shaped friction brake shoe. The brake shoe includes a pair of sidewalls having end extensions which interfit with portions of the mounting bracket, being pivotally connected thereto by means of a wire or pin. Extending between the brake shoe sidewalls is a flat bottom wall which is arranged to engage the tread surface of the rear tire on the bike when the brake shoe is swung rearwardly relative to the mounting bracket.

The brake shoe is moved toward and away from the tire by means of a generally Z-shaped lever. One leg of the lever is secured to one wall extension of the brake shoe and is arranged to pivot about the same wire linking the brake shoe to the mounting bracket. The other leg of the Z-shaped lever extends upwardly and forwardly between the bicycle rear fork and the pedal sprocket. The upper end of that leg is formed with spaced, parallel ears which overlap opposite sides of the pedal sprocket. Extending transversely between those ears is a special spring loaded pivot link to be described in detail later which is arranged to be engaged between the teeth of the pedal sprocket in a non-binding fashion when the sprocket is rotated through a small angle in reverse by the rider. Such engagement drives the link supported at the end of the brake lever downwardly causing the brake lever and the brake shoe to rotate about their common pivot to the mounting bracket, thereby pressing the brake shoe against the rear tire of the bicycle.

Also mounted adjacent the forward end of the brake lever is a single friction pad which resiliently bears against a face of the pedal sprocket at the rear edge margin thereof. When the pedal sprocket is rotated in the forward direction in order to propel the bicycle, the engagement of the friction pad by the sprocket causes that pad and the forward end of the brake lever to follow the upward movement of that part of the sprocket as the sprocket rotates. Accordingly, the brake lever and brake shoe are pivoted about their connection to the mounting bracket thereby swinging the pivot link away from the sprocket teeth at the same time the brake shoe is swung away from the bicycle tire. Consequently there is no ratcheting or clicking noise as the bicycle is being propelled forwardly caused by engagement of the brake mechanism with the sprocket teeth.

The present brake mechanism is also designed so that there is a relatively small distance between the portion of the brake mechanism that is engaged by the sprocket teeth and the pivot about its mounting bracket to the bicycle frame. Furthermore, the point of engagement by the sprocket tooth will the brake mechanism at the time of braking is more or less on a straight line between the sprocket axis and the pivot point of the brake shoe with the mounting bracket. Consequently, amount of torque exerted by the sprocket on the brake shoe is a maximum. Also, that torque remains substantially constant when the rider applies a constant backward torque on the sprocket through its pedals. Resultantly, a conventional sidewalk bicycle equipped with the subject brake mechanism can be operated easily by a small child and it has a stop length versus force characteristic which is substantially linear so that it assuredly conforms to the rigorous government standards for such brakes.

Finally, the present brake mechanism is relatively easy and inexpensive to make. Therefore, it should find wide acceptance in the marketplace.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
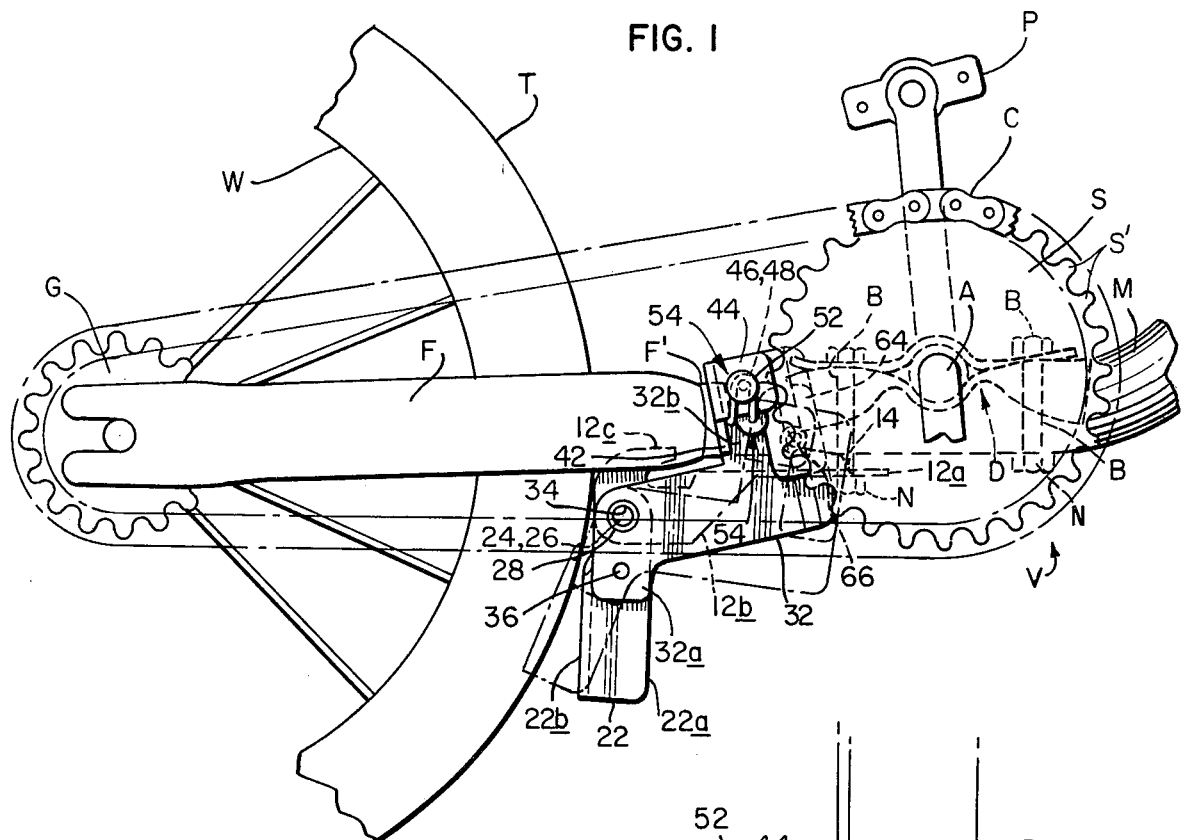
FIG. 1 is a fragmentary side-elevational view of a sidewalk bicycle embodying a sprocket-actuated brake made in accordance with this invention.
Figure 2:
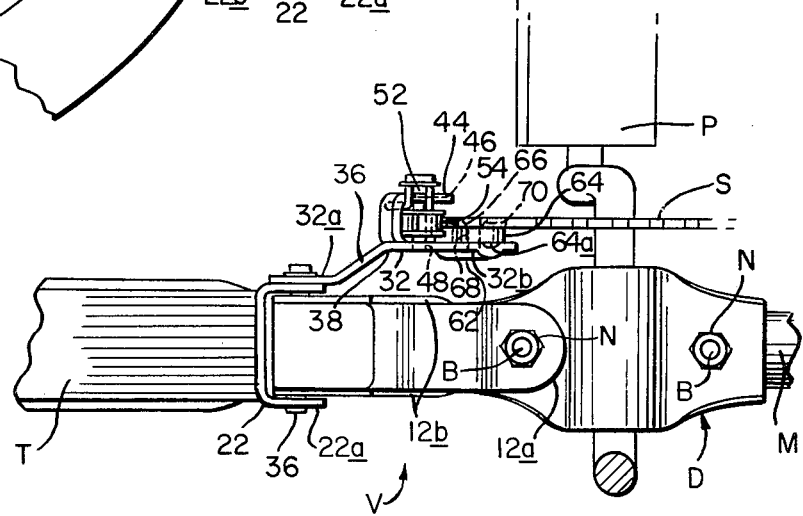
FIG. 2 is a bottom plan view of the FIG. 1 bicycle.

Referring to FIGS. 1 and 2 of the drawings, the subject brake mechanism shown generally 10 is installed on a conventional sidewalk bicycle shown generally at V. The bicycle includes the usually backbone member M, the lower end of which is bifurcated to form the rear fork F—F, which join member M at junction F'. Mounted on member M forwardly of the junction F' is a standard pedal sprocket assembly D. The sprocket assembly includes the usual sprocket S having peripheral teeth S', the sprocket being rotated by pedals P about an axis A. The sprocket assembly is clamped to frame member M by a pair of bolts B, screwed into nuts N.

The bicycle also includes a rear wheel W which is rotatively mounted at the rear end of fork F—F. The rear wheel includes a relatively small, free-wheeling sprocket S', and a chain C is trained around the sprockets G and S' so that when the pedal sprocket S is rotated in the forward direction, i.e., clockwise in FIG. 1 by the rider pushing on pedals P, the rear wheel W is also rotated clockwise so as to propel the vehicle in the forward direction. On the other hand, when the pedal sprocket S is turned in the opposite direction by the rider applying the appropriate backward force on pedals P, the bike continues forwardly while the pedal sprocket coacts with the brake mechanism 10 to cause that mechanism to apply a drag to the rear wheel tire T so as to slow, and ultimately stop, its rotation thereby stopping the forward movement of the vehicle V as a whole.

Still referring to FIGS. 1 and 2, the brake mechanism 10 comprises a rigid stamped metal mounting bracket 12 having a forwardly extending tongue 12a and a pair of transversely spaced apart, downwardly extending walls 12b. The rear end of walls 12b are formed with a pair of upwardly, forwardly extending noses or hooks 12c. These hooks are arranged to engage fork F—F at the junction F' thereof with the frame member M. The bracket tongue 12a has a generally elliptical opening 14 sized to receive the rear bolt B of the sprocket assembly D. The nut N on that bolt is simply removed so that the bolt can be inserted through the opening 14 following which the nut N is replaced on the end of the bolt B now projecting through the bracket 12.

A saddle-shaped brake shoe 22 depends from and is pivotally connected to the mounting bracket 12. The brake shoe includes a pair of spaced-apart sidewalls 22a and a connecting bottom wall 22b extending between the sidewalls. The sidewalls 22a extend upwardly beyond bottom wall 22b and they are spaced apart a distance that is slightly less than the distance between the mounting bracket sidewalls so that the shoe walls 22a nest inside the bracket sidewalls 12b. Sidewalls 22a are provided with a pair of in-line openings 24 which are in register with a similar pair of in-line openings 26 in the bracket sidewalls 12b. A pivot pin or wire 28 extends through these openings and its opposite ends are upset so as to pivotally connect the bracket and brake shoe together so that the shoe 22 is swingable from a rearward position wherein its wall 22b engages tire T to a forward position wherein that wall is spaced forwardly of the tire.

In order to move the brake pad between its two aforesaid positions, the brake mechanism 10 includes actuating means comprising a generally Z-shaped brake lever 32 which extends between the brake shoe 22 and the sprocket S. Lever 32 has a depending leg 32a which is positioned flush against the outside of a wall 22a of brake shoe 22. Arm 32a includes an opening 34 for loosely receiving the pin 28 that pivotally connects the brake shoe to the mounting bracket 12. Arm 32a and the bracket side wall 32a are also permanently secured together by a rivet 36 at a location spaced below the pivot pin 28. Thus, the lever 32 pivots about pin 28 along with the brake shoe 22.

The forward leg 32b of the lever 32 extends up between sprocket S and frame M. In order to accomplish this, the lever is bent along bend lines 36 and 38 (FIG. 2) so that leg 32b is displaced laterally relative to leg 32a. In other words, as seen in FIG. 1, the leg 32b is located closer to the viewer than is leg 32a.

Still referring to FIGS. 1 and 2, the rear edge of leg 32b is formed with an integral tab 42 that extends laterally beyond the pedal sprocket S. Also, near the upper end of tab 42 is an integral forwardly extending ear 44 that extends parallel to the leg 32b, but on the opposite side of the sprocket S therefrom. A pair of in-line openings 46 and 48 are formed in ear 44 and leg 32b for receiving a shoulder rivet 52 extending between those openings. The rivet 52 supports a spring-loaded pivot link 54 to be described presently and the ends of the rivet are upset so that the rivet and pivot link are permanently secured to the lever.

Figure 3A:
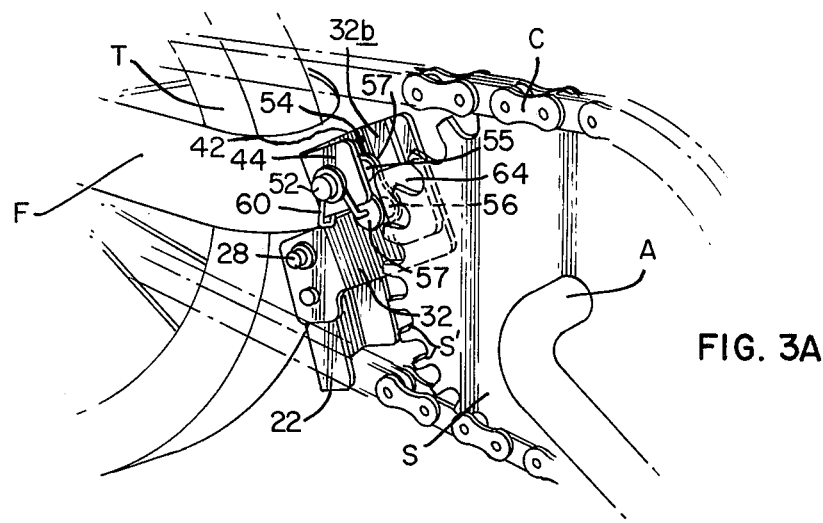
FIGS. 3A to 3C are fragmentary isometric views illustrating the operation of the brake mechanism on the FIG. 1 bicycle.

Referring now to FIGS. 1 and 3A, pivot link 54 is the same as the standard link in a standard bicycle chain. That is, as viewed from the side, it has the general shape of the figure eight. It comprises a pair of spaced-apart tubular rollers 55 and 56 rotatively secured between a pair of side plates 57 by tubular pins (not shown). The rivet 52 extends through one link pin, so that the link is swingably secured to the brake lever. A spring 60 coiled around a projecting end of rivet 52 has one end projecting into the link pin and its other end engaging tab 42. The spring is wound so that it biases the link 54 about rivet 52 toward sprocket S, i.e. counterclockwise in FIG. 1.

Formed in the forward lever leg 32b facing sprocket S is a generally vertical channel or groove 62 which rigidifies the lever. Also a generally rectangular friction pad 64 is mounted on the lever leg 32b. Pad 64 has a generally vertical rib 64a which fits snugly in channel 62 to maintain the pad more or less parallel to leg 32b. A countersunk opening 66 extends through pad 64 and is in register with an opening 68 formed in leg 32b at the bottom of channel 62. A headed rivet 70 recessed into the pad opening 66 with its opposite end projecting through opening 68 securely anchors the pad to the lever leg. As best seen in FIGS. 1 and 2, the thickness of pad 64 is such that its fully exposed face bears against the inside face of sprocket S at the rear edge margin thereof. The pad is made of polyurethane or other similar relatively resilient plastic so that it resiliently presses against the sprocket face when the brake mechanism 10 is properly installed.

During operation of the brake, when the rider rotates the pedal sprocket S in the direction to propel the vehicle, i.e., clockwise in FIG. 1, the resilient engagement between the friction pad 64 and the sprocket S causes the upwardly moving rear edge margin of the sprocket to drag the friction pad 64 along with it. This upward movement of the pad and of the lever leg 32b to which it is attached pivots the lever 32 as well as the brake shoe 22 about the pivot pin 28 so that the brake shoe is swung to a forward position as shown in solid lines in FIGS. 1 and 3A where it is out of engagement with tire T.

At the same time, however, the pivot link 54 is swung upwardly and rearwardly as shown in those same figures so that those elements are positioned rearwardly of the tips of the sprocket teeth T. Consequently, as long as the vehicle is being pedaled in the forward direction, there is no ratcheting or clacking noise caused by link 54 following the sprocket. Since the friction pad 64 is made of plastic, any sound created by the sprocket S rubbing against the friction pad 64 as the vehicle is propelled forwardly, is minimal.

Figure 3B:
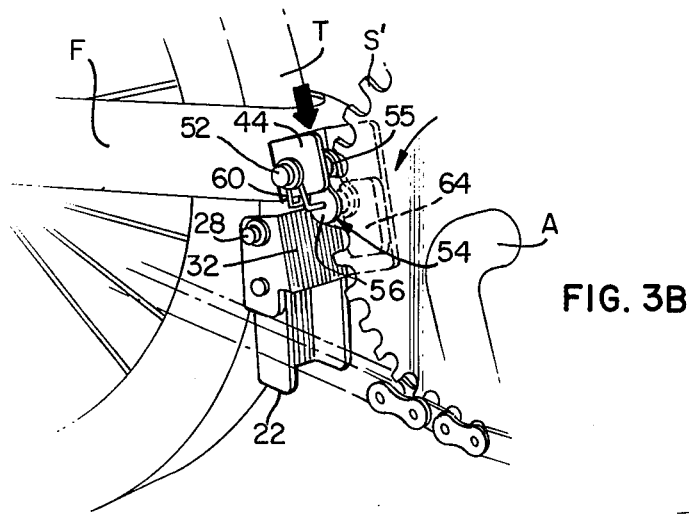

When the rider moves the pedals in reverse so as to turn the sprocket S counterclockwise in the direction indicated by the arrow in FIG. 3B, the downwardly moving rear-edge margin of the sprocket tends to drag the friction pad 64 down with it. This causes the brake lever 32 to pivot clockwise so that the pivot link 54 is swung toward sprocket S. Since the link is spring loaded, its lower roller 56 engages the sprocket first and automatically bottoms in the groove between adjacent teeth S' as shown in FIG. 3b. This assures that with a further slight backward rotation of the sprocket the upper roller 55 will bottom in the next upper sprocket groove, with the intervening sprocket tooth projecting between the rollers as it does in the links of the chain C.

Figure 3C:
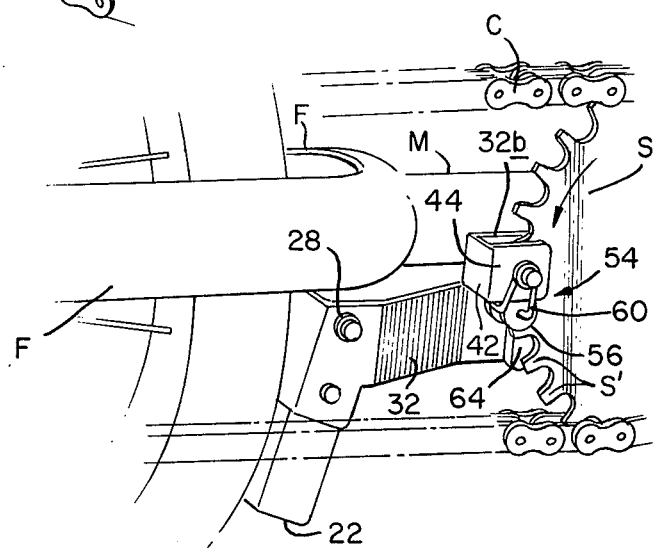

Once roller 55 is engaged between the sprocket teeth, a further slight counterclockwise rotation of the sprocket drives link 54 downwardly so that lever 32 and brake shoe 22 are swung clockwise about their pivot 28. The result is that the brake shoe frictionally engages against the periphery of the tire T as seen in FIG. 3C and in dotted lines in FIG. 1 producing a drag on the tire which brings the vehicle V to a gradual stop. Thus the lower roller 56 acts as a lead into the sprocket teeth, while the upper roller 55 transmits the actual braking forces from the sprocket to the brake mechanism. Without such a lead-in arrangement, there is a possibility that the upper roller 55 would become bound up on the tip of a sprocket tooth.

It is important to note that the distance between the sprocket axis A and pivot pin 28 and the dimensions of lever 32 are selected so that the upper roller 55 is engaged between the sprocket teeth S' when that roller is positioned slightly above an imaginary straight line extending between the sprocket axis A and the pivot pin 28 of the brake mechanism 10. Consequently, the force applied by the sprocket to the lever is in a direction perpendicular to the effective lever arm extending between pivot pin 28 and the lever. Therefore a maximum amount of torque is coupled to brake shoe 22 for a given amount of force applied by the rider to pedals P.

Moreover, that torque is more or less constant over the relatively small angle through which the sprocket S is rotated counterclockwise to actuate the brake. As a result, a vehicle V equipped with brake 10 has a stop-length versus force characteristic which is more or less linear. In other words, for a given amount of force on pedals P, a proportional amount of drag in imparted to the rear wheel W. Resultantly when the brake is actuated, the braking distance is inversely proportional to the amount of force applied by the rider. Thus the brake is quite efficient so that even small children can operate it effectively. Moreover the rider can easily get the "feel" of the brake because of the aforesaid linearity.

It is apparent from the aforesaid description that brake 10 is composed of a minimum number of parts. The mounting bracket 12, the brake shoe 22, and the lever 32 are all simple stamped metal parts. The friction pad 64 is a simple moded plastic part. The pivot link is an off-the-shelf item. All these various components are connected by rivets and a single pivot pin which are also simply made and inexpensive in quantity. Consequently, the brake mechanism as a whole is very easy and inexpensive to manufacture and to assemble. Finally, it can be installed easily on existing bicycles equipped with a free-wheeling rear wheel sprocket simply by removing and replacing a single nut.

It will thus be seen that the objects set forth above among, those made apparent from the preceding description, are efficiently attained, and since certain chages may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and is desired to be secured by Letters Patent of the United States is:

1. A sprocket-actuated brake of the type including a bracket for mounting on the bike between its rear fork and pedal sprocket, a brake shoe pivotally connected to the bracket and swingable against the rear bike tire, actuating means connected to the shoe having a part engageable by the teeth of the pedal sprocket to press the shoe against the tire when the sprocket is rotated in reverse through a small angle, the improvement wherein said part comprises a link pivotally connected at one sprocket-engageable end to said actuating means and means for biasing the link about its pivotal connection so that its opposite sprocket-engageable end is urged toward the sprocket whereby when the sprocket is rotated in reverse, said opposite link end acts as a lead into the sprocket teeth ensuring that said one link end bottoms between adjacent sprocket teeth when force is transmitted to the brake shoe.

2. The brake defined in claim 1 and further including means for maintaining said link out of engagement with said sprocket when said sprocket is rotated in the forward direction.

3. A sprocket-actuated bike brake of the type including a bracket for mounting on the bicycle between the bike's rear fork and pedal sprocket, a brake shoe pivotally connected to the bracket and movable between a first position wherein it engages and imparts a drag on the rear tire, and a second position wherein it is disposed forwardly of and out of engagement with said tire, actuating means connected to the brake shoe and having a part positioned to be engaged by rearwardly projecting teeth on the bike sprocket so that when the sprocket is rotated in reverse, the sprocket teeth depress said part so that said actuating means moves the brake shoe to its said first position, said actuating means being shaped and dimensioned so that its said part lies substantially on a straight line extending between the sprocket axis and the connection between the brake shoe and the bracket when engaged by the sprocket teeth so that the force applied by the sprocket to the part is in a direction perpendicular to the lever arm between said part and the pivotal connection between the brake shoe and the bracket whereby the amount of drag imparted by the brake shoe to the tire is maximum and is substantially proportional to the amount of reverse torque applied to the pedal sprocket.

4. The brake defined in claim 3 and further including friction means mounted adjacent said part, for frictionally engaging a side face of the pedal sprocket at a rear edge margin thereof so that when the sprocket is rotated in the direction to propel the bicycle, the friction means is dragged upwardly so that said actuating means is maintained out of engagement with the sprocket teeth and the brake shoe is maintained in its said second position.

5. The brake defined in claim 4 wherein said friction means comprises a plastic pad mounted on the actuating means, said pad having a surface engaging a side face of the sprocket.

6. The brake defined in claim 3 wherein said actuating means is also pivotally connected to the mounting bracket and said part includes portions of the actuating means that straddle the edge of the pedal sprocket, said part further including means extending between said straddling portions for engagement by the sprocket teeth.

7. The brake defined in claim 3 wherein said part comprises a link pivotally connected at one sprocket-engagable end to said actuating means and means for biasing the link about its pivotal connection so that its opposite sprocket-engagable end is urged toward the sprocket.

* * * * *

UNITED STATES PATENT AND TRADEMARK OFFICE
CERTIFICATE OF CORRECTION

PATENT NO. : 4,254,848
DATED : March 10, 1981
INVENTOR(S) : Mark D. Moss

It is certified that error appears in the above—identified patent and that said Letters Patent are hereby corrected as shown below:

Col. 1, line 59, change "battery" to --braking--.

Col. 1, lines 65 and 66, after "ted", delete --through a selected angle, the amount of force transmitted--.

Col. 3, line 46, change "will" to --with--.

Col. 4, line 28, change "S'" to --G--.

Col. 4, line 29, change "G" to --S--.

Col. 4, line 29, change "S'" to --G--.

Col. 7, line 1, change "in" to --is--.

Col. 7, line 13, changed "moded" to --molded--.

Col. 7, line 25, change "chages" to --changes--.

Signed and Sealed this

Twenty-seventh Day of October 1981

[SEAL]

Attest:

GERALD J. MOSSINGHOFF

Attesting Officer    Commissioner of Patents and Trademarks